United States Patent [19]

Engels

[11] Patent Number: 5,481,822

[45] Date of Patent: Jan. 9, 1996

[54] FISHERMAN'S BAG

[76] Inventor: Russell W. Engels, R.D. 4, Box 429B, Sussex, N.J. 08638

[21] Appl. No.: 946,786

[22] Filed: Sep. 18, 1992

Related U.S. Application Data

[63] Continuation of Ser. No. 414,690, Sep. 29, 1989, abandoned.

[51] Int. Cl.$^6$ .................................................. A01K 97/04
[52] U.S. Cl. ...................... 43/54.1; 297/188.12; 312/266
[58] Field of Search ........................... 43/54.1, 57, 57.1; 206/315.11; 297/192; 312/266

[56] References Cited

U.S. PATENT DOCUMENTS

| | | | |
|---|---|---|---|
| 1,900,847 | 3/1933 | Siday | 43/54.1 |
| 2,493,084 | 1/1950 | Pharo | 43/54.1 |
| 3,128,137 | 4/1964 | Dokter | 206/315.11 |
| 3,947,991 | 4/1976 | Morcom | 43/54.1 |
| 4,128,170 | 12/1978 | Elliott | 43/54.1 |
| 4,184,281 | 1/1980 | Corby | 43/57 |
| 4,301,898 | 11/1981 | Plough | 206/315.11 |
| 4,745,704 | 5/1988 | Schaefer | 43/54.1 |
| 4,999,943 | 3/1991 | Crabtree | 43/54.1 |

*Primary Examiner*—Kurt Rowan
*Attorney, Agent, or Firm*—Furgang & Milde

[57] ABSTRACT

A plurality or spaced side walls of flexible cloth-like material extend up from and are secured to a bottom wall, of the same material and define therebetween an interior space for a fisherman's tackle bag. A pair of interior pockets are formed within the interior space and a plurality of exterior pockets are secured to outer surfaces of the side walls; the pockets being of a size and configuration to house fishing tackle. A hollow tube is secured to and rises up from the bottom wall through which an opening is formed in alignment with the hollow in the tube so that the tube may be positioned about the vertical support post of a fisherman's chair to position the tackle bag and tackle in the space between the chair bottom and the deck of the boat to which the chair is mounted. At least one drain hole extends through the material of the bag leading from the interior space.

21 Claims, 2 Drawing Sheets

FISHERMAN'S BAG

This is a continuation of application Ser. No. 07/414,690, filed on Sep. 29, 1989, now abandoned.

BACKGROUND OF THE INVENTION—FIELD OF APPLICATION

This invention relates to carrying bags, totes and the like, and, more particularly to carrying bags for use by fisherman for storing and carrying fishing tackle and the like.

BACKGROUND OF THE INVENTION—DESCRIPTION OF THE PRIOR ART

Many people enjoy, if not love, the sport of fishing. Some as amateurs who fish occasionally others avid sportsman who go fishing whenever they can get away to do so. As in other sports fishing includes its share of professionals and persons who engage in contests of one sort or another for fame, fortune or just the fun of it.

Whether the fisherman is an occasional amateur, avid sportsman, professional or serious contestant they will usually require a certain amount of fishing tackle to facilitate, improve and increase the joy of the sport. Various sizes, kinds and configurations of hooks, bait, lines, leaders, weights and the like are included in the broad category of fishing tackle.

Carrying devices such as totes, bags, packets and the like are available for use by fisherman for storing, arranging and transporting fishing tackle. These range from relatively simple packet-like devices such as shown in U.S. Pat. No. 4,527,350 issued on Jul. 9, 1985 to D. R. Tockey, Jr., for Worm Carriers to relatively complex multi-packet and carrying bag combinations such as shown in U.S. Pat. No. 4,691,469 issued on Sep. 8, 1987 to L. C. Alsobrook, et al for *Fishing Tackle Management System And Method*. However, whether quite simple like the packet of Tockey Jr or quite complex like the system of Alsobrook et al, when such tackle carriers are used on a fishing vehicle, such as a rowboat, powerboat, sailboat or the like, especially a powerboat equipped for fishing, they may move around and away from the fisherman especially when the boat is rocking from the waves and moving through the water under power. The tackle in the carrier is not quite so useful when its carrier must be chased after. This may also make the sport of fishing much less enjoyable. Such tackle containers and carriers lack any structure to facilitate securing them in place.

One available way of securing a fishing tackle carrier in place is to mount same on a belt that can be worn around the fisherman's body. An example of such a device is shown in U.S. Pat. No. 4,323,181 issued on Apr. 6, 1982 to J. Spasoff for *Belt-Mounted Fishing Tackle Carrier*. With such device the user most surely knows where their tackle is. However, such a tackle carrier is cumbersome, can be weighty most surely may interfere with the user's mobility and ability to use their arms. More importantly, if the user is secured into a chair such as a fighting chair on a fishing boat, the harness securing the person into the chair and the belt-mounted tackle carrier may interfere in such a way as to require the user to takeoff the belt mounted tackle carrier. Thus, the tackle may, in fact, not be conveniently located when needed.

U.S. Pat. No. 3,128,137 issued to R. F. Dokter on Apr. 7, 1964 for *Combination Folding Chair And Tackle Box* shows an example of a tackle carrier disposed in relationship to a fisherman's seat. The carrier is, however, secured by bolts to the seat and the seat is most definitely not of the single pedestal type used as a "fighting seat" on a fishing boat. Thus, the tackle box/seat combination of Dokter is not suitable for use on a boat moving through waters wherein a fighting chair type seat is required.

A single pedestal "fighting chair" or seat and tank combination is shown and described in U.S. Pat. No. 4,184,281 issued on Jan. 22, 1980 to K. W. Corby et al for *Live Bait Well*. Such a construction, however, is relatively expensive, requires connections into and out from the container to facilitate circulation of water, is permanent to the boat and is not suitable for fishing tackle.

U.S. Pat. No. 4,745,704 issued on May 24, 1988 to L. J. Schaefer for *Portable Storage Receptacle* shows a suitcase-like container constructed for disposition about the post of a pedestal-type fishing chair. The Schaefer container, however, is constructed of relatively hard material, requires the user to reach beneath the chair to open covers, has covers which extend beyond the perimeter of the chair and may thus interfere with fishing and will retain within its body water which will most certainly slosh on board the boat. In addition, while Schaefer indicates that the tackle container may rotate about the pedestal post the provision of finger-like elements within the opening extending through the Schaefer container will most probably interfere with such movement and may, in fact, significantly limit the use of such a container construction to particular pedestal post sizes and configurations.

SUMMARY OF THE INVENTION

It is therefore an object of this invention to provide a new and improved fisherman's bag.

It is another object of this invention to provide a new and improved fisherman's tackle bag.

It is another object of this invention to provide a new and improved fisherman's tackle bag of relatively flexible material.

It is yet another object of this invention to provide a new and improved tackle bag for disposition in relatively fixed manner on a fishing boat.

It is still another object of this invention to provide a new and improved tackle bag for disposition with respect to a single-pedestal type fishing or fighting chair of a fishing boat.

It is yet still another object of this invention to provide a fisherman's tackle carrier of relatively flexible fabric material with a tube-like member to facilitate disposition of the bag about the post of a single-pedestal fisherman's chair.

It is a further object of this invention to provide a fisherman's tackle bag with drainage openings.

Other objects, features, and advantages of this invention in its details of construction and arrangement of parts will be seen from the above, from the description of the preferred embodiment when considered with the drawing and from the appended claims.

DESCRIPTION OF THE PREFERRED EMBODIMENT

Figure 1:
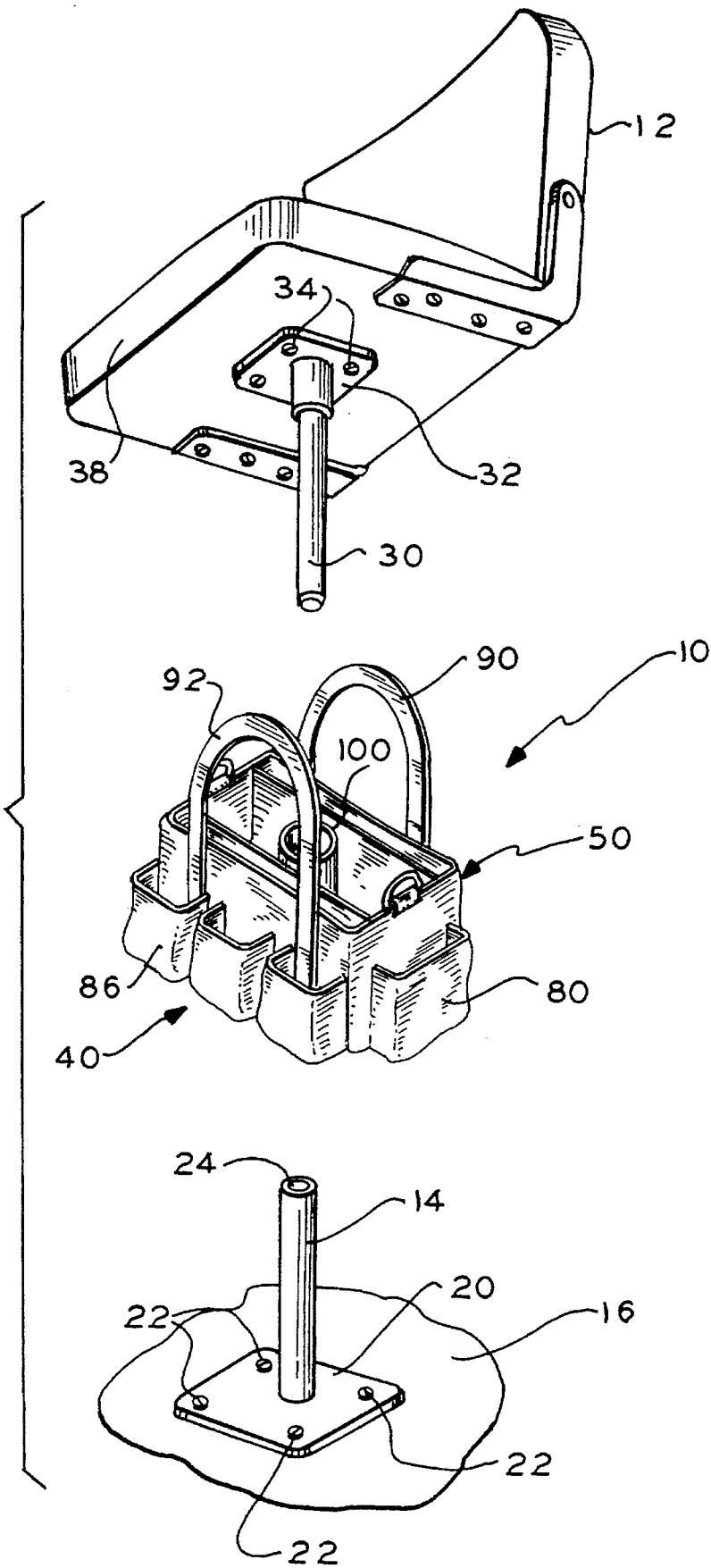
FIG. 1 is an exploded perspective view of a pedestal-type fishing chair with a fisherman's tackle bag, incorporating the instant invention, disposed in position with respect thereto.

With reference to FIG. 1, there is generally shown at 10 fisherman's tackle bag incorporating the instant invention and disposed in position with respect to a fisherman's chair 12 and a support post 14 secured to a deck 16 of a fishing boat. In general, chair 12 and support post 14 are of conventional construction with post 14 including a plate 20 that is secured to deck 16 of the fishing boat by threaded members 22 such as bolts or the like. Post 14 is in the form of a hollow tube with a cylindrical opening 24 of a size and configuration to receive a support shaft 30 extending from and secured to the bottom of chair 12 by a plate 32 and bolts 34 or the like. The chair and support post construction is conventional for fishing boats and when shaft 30 is disposed in opening 24 of post 14 a seat 38 of chair 12 will be disposed at a selected height above deck 12 creating a space 40 therebetween.

It is within space 40, when chair 12 is disposed on post 14, that fisherman's tackle bag 10 is to be disposed.

Figure 2:
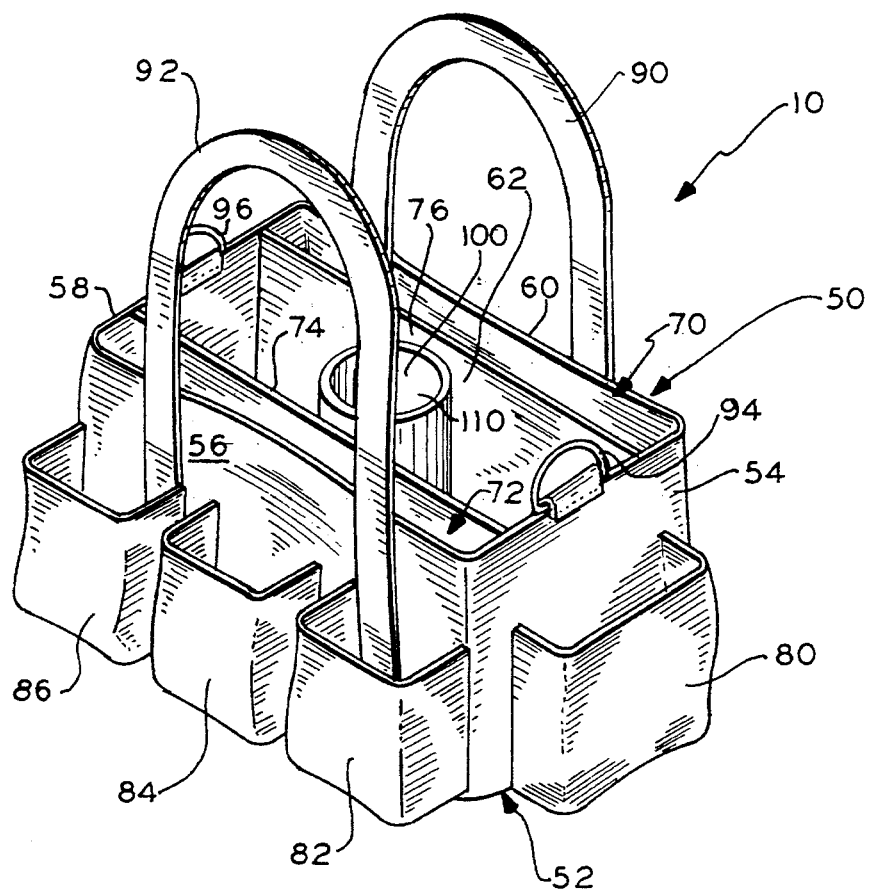
FIG. 2 is a perspective view of the fisherman's tackle bag of FIG. 1 enlarged to better show details thereof.
Figure 3:
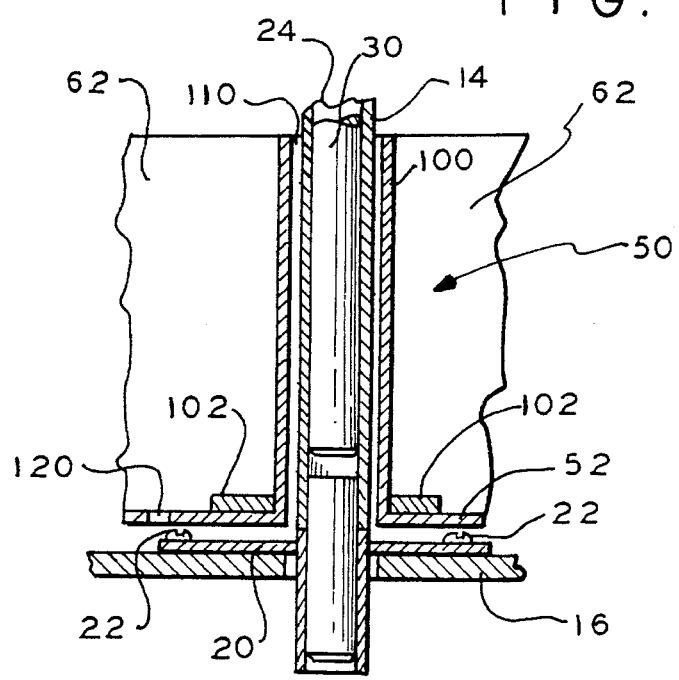
FIG. 3 is a vertical sectional view through the tackle bag as disposed about a chair pedestal.

Bag 10 is fabricated from relatively flexible fabric-like material, such as canvas, plastic or the like, and includes a body portion 50 (FIGS. 1 and 2) having a bottom 52 (FIGS. 2 and 3) and opposed and spaced side walls 54, 56, 58, 60 (FIG. 2) rising vertically therefrom and defining an interior space 62. A pair of internal pockets 70, 72 are formed within bag 10 by walls 74, 76 which rise from bottom 52 and are respectively spaced from side walls 56 and 60. A number of exterior pockets 80, 82, 84, 86 are disposed about the outer periphery of the side walls of bag 10.

All the pockets 70, 72, 80–86 are preferably formed by utilizing material of the same fabric (canvas, plastic) as that of bottom 52 and side walls 54–60 of bag 10. The number of such pockets and their disposition within and about bag 10 will depend upon the size and intended use or uses for bag 10 (type of fishing and fishing tackle). The material of pockets 70, 72 and 80–86 as well as that of bottom 52 and side walls 54–60 of bag 10 may be formed in suitable lengths for the purpose and secured together by sewing, adhesive, or similar construction or combinations thereof.

A pair of handles 90, 92, which may be of the same material as the rest of bag 10, are respectively secured to sides 60 and 56 of bag 10 by sewing, adhesive or the like and may, if desired, extend around bottom 52 and be secured or connected to each other. A pair of "D" type rings 94, 96 are suitably and conventionally secured to side walls 54 and 58 respectively of bag 10 for attachment, by hooks or the like, to a shoulder strap if desired.

A positioning pipe or tube 100 (FIGS. 1, 2 and 3) extends up from bottom 52 (FIG. 3) of bag 10 to facilitate disposition of bag 10 about post 14 and within space 40. Pipe 100 may be fabricated from suitable metal or plastic (such as PVC) and is provided at its bottom with a flange 102 that is secured to bottom 52 of bag 10 by a suitable adhesive, threaded fasteners, sewing, or other suitable and appropriate means. Pipe or tube 100 is preferably of a length or height commensurate with the height of side walls 54–60 of bag 10 but may be taller or shorter, as long as it fits within space 40. The external and internal configuration of pipe 100 may be of any conventional configuration such as round, square, hexagonal, etc., as long as the hollow 110 within pipe 100 is of a size and configuration to fit about post 14. The relative spacing between post 14 and the inner wall surface of pipe 10 may be selected to provide a selected degree of movability of bag 10 about post 14.

One or more drain holes 120 (FIG. 1) are provided for bag 10. Holes 120 may be formed as desired within space 62, pockets 70, 72 and/or pockets 80–86. The number and disposition of drain holes 120 are selected to accommodate the amount of unwanted water that may enter bag 10. The size and disposition of drain holes 120 are selected so that tackle stored in the pockets of bag 10 does not drop out.

In use the person lifts chair 12 off of a post 14 and positions pipe 100 about post 14 shaft 30 of chair 12 is then positioned within opening 24 of post 14. As such, bag 10 is securely disposed in space 40 between chair 12 and deck 16 with the pockets thereof and their contents readily available to the user. Bag 10 may be easily removed by removing chair 12 and lifting bag 10 off of post 14.

From the above description it will thus be seen that there has been provided a new and unique fisherman's tackle bag formed of flexible material but which can be readily and securely disposed in the space beneath a fisherman's chair seat and the boat deck therebelow.

It is understood that although I have shown the preferred embodiment of my invention that various modifications may be made in the details thereof without departing from the spirit as comprehended by the following claims.

What is claimed is:

1. A fisherman's bag, comprising:
   (a) bag body means constructed from material which forms a bottom wall and opposed and spaced side walls defining therebetween an interior space;
   (b) positioning tube means of predetermined size and configuration secured to and extending up from said bottom wall;
   (c) the hollow of said tube means being of a size and configuration to be disposed about a vertical support post of a fisherman's seat; and
   (d) opening means extending through said bottom wall in alignment with and of a size and configuration corresponding to that of the hollow of said tube means;
   (e) said positioning tube means being secured only to said bottom wall and being unsupported at its top.

2. The fisherman's bag of claim 1, wherein said hollow of said tube means is of a size and configuration to be disposed about a vertical post of a single pedestal type fisherman's chair secrued to a boat deck.

3. The fisherman's bag of claim 2, wherein at least one drain opening is provided through the material of said bag body means.

4. The fisherman's bag of claim 3, wherein a plurality of said drain openings are so provided.

5. The fisherman's bag of claim 2, wherein said material of said bag means is relatively flexible.

6. The fisherman's bag of claim 5, wherein said material is canvas.

7. The fisherman's bag of claim 2, wherein said tube means is substantially centered within said interior space and spaced from said opposed and spaced side walls.

8. The fisherman's bag of claim 2, wherein said tube means is of cylindrical configuration.

9. The fisherman's bag of claim 8, wherein the hollow within said tube means is of cylindrical configuration.

10. The fisherman's bag of claim 2, including at least one pocket formed and disposed within said interior space.

11. The fisherman's bag of claim 10 including at least a pair of pockets formed and disposed within said interior space.

12. The fisherman's bag of claim 2, including at least one pocket secured to an outer surface of one of said side walls.

13. The fisherman's bag of claim 12, including a plurality of pockets secured to an outer surface of one of said side walls.

14. The fisherman's bag of claim 13, including a plurality of pockets secured to outer surfaces of more than one of said side walls.

15. The fisherman's bag of claim 14, including a pair of pockets disposed within said interior space.

16. The fisherman's bag of claim 15, including at least one drain opening extending through said material of said bag body means.

17. The fisherman's bag of claim 16, wherein said drain opening is formed to extend out from said interior space.

18. The fisherman's bag of claim 17, including a pair of handles extending up from and carried by said bag body means.

19. The fisherman's bag of claim 18, including a pair of "D" rings secured to said bag body means.

20. The fisherman's bag of claim 19, wherein said tube means is centered within said interior space.

21. A fisherman's bag; comprising:
 (a) bag body means constructed from material which forms a bottom wall and opposed and spaced side walls defining therebetween an interior space;
 (b) positioning tube means of predetermined size and configuration secured to and extending up from said bottom wall and centered within said interior space;
 (c) the hollow of said tube means being of a size and configuration to be disposed about a vertical support post of a single pedestal type fisherman's seat secured to a boat deck;
 (d) opening means extending through said bottom wall in alignment with and of a size and configuration corresponding to that of the hollow of said tube means;
 (e) a plurality of pockets secured to outer surfaces of more than one of said side walls;
 (f) a pair of pockets disposed within said interior space;
 (g) at least one drain opening formed to extend out from said interior space and extending through said material of said bag body means;
 (h) a pair of handles extending up from and carried by said bag body means;
 (i) said handles extending about and being secured to said bottom wall so as to lend support to said bottom wall upon lifting said bag; and
 (j) a pair of "D" rings secured to said bag body means.

* * * * *